(12) United States Patent
Williams

(10) Patent No.: US 6,411,982 B2
(45) Date of Patent: *Jun. 25, 2002

(54) THREAD BASED GOVERNOR FOR TIME SCHEDULED PROCESS EXECUTION

(75) Inventor: Roy H. Williams, Loveland, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,147

(22) Filed: May 28, 1998

(51) Int. Cl.[7] .................................................. G06F 9/00
(52) U.S. Cl. ........................................ 709/102; 709/103
(58) Field of Search ................................. 709/100–108

(56) References Cited

U.S. PATENT DOCUMENTS

| | | | |
|---|---|---|---|
| 4,908,750 A | * | 3/1990 | Jablow |
| 5,220,653 A | * | 6/1993 | Miro ........................... 709/107 |
| 5,528,513 A | * | 6/1996 | Vaitzblit et al. ............ 709/103 |
| 5,752,031 A | * | 5/1998 | Cutler et al. ................. 709/103 |
| 5,832,262 A | * | 11/1998 | Johnson et al. ............. 709/102 |
| 5,940,612 A | * | 8/1999 | Brady et al. ................. 709/103 |
| 6,170,042 B1 | * | 1/2001 | Gaertner et al. ............ 711/158 |
| 6,349,321 B1 | * | 2/2002 | Katayama .................... 709/103 |
| 6,353,844 B1 | * | 3/2002 | Bitar et al. .................. 709/102 |

* cited by examiner

Primary Examiner—Zarni Maung
Assistant Examiner—G. Lawrence Opie

(57) ABSTRACT

A scheduling governor that regulates the number of scheduled tasks that are executed concurrently over a network computer system is presented. All task requests that are scheduled to be executed within a pre-specified interval of time, are serviced according to their priority. During heavy load times, the scheduling governor prevents overloads of the processing resources of the host computer by limiting the number of concurrently executing scheduled tasks to a pre-specified capacity dimension. Task requests that are unable to be run due to the governed cap on the number of allowed concurrently executing processes are given a priority to be executed once one of the fixed number of execution slots becomes available. Accordingly, the scheduling governor allows each scheduled task to be executed as close to its scheduled time as possible yet prevents system resource overload to improve efficiency and performance.

7 Claims, 6 Drawing Sheets

THREAD BASED GOVERNOR FOR TIME SCHEDULED PROCESS EXECUTION

FIELD OF THE INVENTION

The present invention pertains generally to network management systems, and more particularly, to a method and system for governing the number of concurrently executing processes in a process scheduler.

BACKGROUND OF THE INVENTION

The maintenance of a computer network is typically performed under the control of a network management system. The network management system monitors the occurrences of certain events across the system, such as network node utilization and disk I/O performance. To assist in network maintenance, reporting applications may be used to organize and present network event information into a format useful to the system administrator. These reports, depending on the type of information gathered, may be generated on a pre-determined schedule, e.g., once every ten minutes, once daily, or once weekly.

In the prior art, scheduling applications that schedule the execution of processes such as report generating applications causes execution of the scheduled applications to occur at precisely the time that they are scheduled. This technique can be problematic. Due to the cyclical nature of work week timing, there is a very high propensity for requests to be clustered around certain times of the day. For example, it often makes sense to generate daily reports at exactly midnight so that data used in generating those reports need not necessarily be saved from day to day. When too many processes are scheduled at the same time, and hence concurrently run, the performance of the network system may be adversely impacted due to not enough system resources being available to service all of the executing processes. System resources must then be time-shared according to a priority scheme across all executing processes, resulting in very slow performance for all processes or at least those that have low priority.

Accordingly, a need exists for a method for governing the number of allowed concurrently executing processes launched by the scheduler, to thereby increase system performance in the face of a heavy schedule load.

SUMMARY OF THE INVENTION

The present invention is a thread-based scheduling governor that regulates the number of scheduled tasks that are executed concurrently. The schedule governor of the invention is implemented using threads. In the system of the invention, a task goes through a life cycle. In infant form, it is given a slot on the file system as a "request file"; it graduates from "in-file" form to "in-memory" form, where it is maintained as an idle thread in a priority-ordered queue. When the time comes for the task to be executed, the task is allotted a space, if available, in a capped in-service queue, where the task graduates from "in-memory" form to "process execution" form. When a task is entered in the in-service queue, the thread launches the process(es) to accomplish the task, and monitors them for their completion. Upon completion of the monitored processes, the thread cleans up its in-service queue entry to allow another pending task to occupy the regulated cap on dispatched processes. Accordingly, a thread maintains control over a task, but system resources do not become dedicated to the processes required by the task until a process execution slot in a capacity-governed in-service queue becomes available.

In accordance with the invention, all task requests that are scheduled to be executed within a pre-specified interval of time are serviced on a first-in first-out (FIFO) basis and use absolute, or "epoch", time according to their scheduled position in time. During heavy load times, the scheduling governor prevents overloads of the processing resources of the host computer by limiting the number of concurrently executing processes to a pre-specified capacity dimension. Task requests that are unable to be run due to the governed cap on the number of allowed concurrently executing processes are deferred until one of the fixed number of execution slots becomes available. Accordingly, the scheduling governor allows each scheduled task to be executed as close to its scheduled time as possible yet prevents system resource overload to improve efficiency and performance.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

Figure 1:
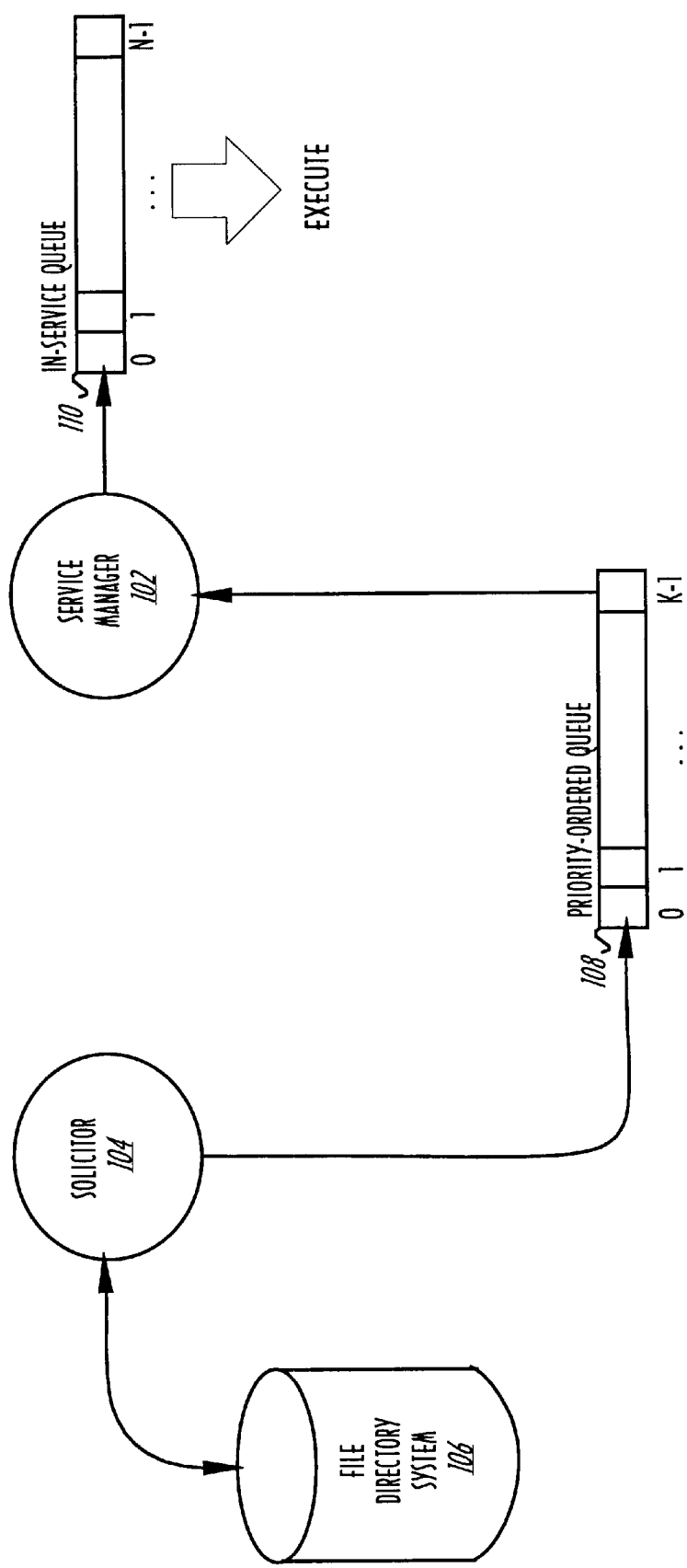
FIG. 1 is a block diagram of a processing system in which the scheduling governor of the invention operates.

FIG. 1 is a block diagram of a processing system 100 in which the scheduling governor of the invention operates. System 100 includes a service manager 102, a solicitor function 104, a file directory system 106, a Priority-Ordered queue 108, and an In-Service queue 110. Solicitor function 104 locates and queues task requests into Priority-Ordered queue 108 as specified in file directory system 106 which will be due to be executed within a time interval specified by service manager 102. Service manager 102 only accepts task requests from Priority-Ordered queue 108 that are due within the specified time interval. All other task requests are either discarded until discovered on a later search by solicitor function 104. Task requests that are discovered by solicitor function 104 to be scheduled within the pre-specified time interval are entered into Priority-Ordered queue 108 in sorted time order, where one end of the queue represents the current time and the other end of the queue represents the length of the time interval before the current time. Thus, tasks are transferred from Priority-Ordered queue 108 to In-Service queue 110 on a first-in first-out (FIFO) basis. Service manager 102 manages an In-Service queue 110. In-Service queue includes n execution entries, where n is the pre-specified maximum number of scheduled tasks that are allowed to be executed concurrently. When any execution entry in In-Service queue is empty (i.e., becomes available), service manager 102 transfers the highest priority (in the preferred embodiment, priority is time-ordered) task request from priority-ordered queue to the available execution entry in In-Service queue, and execution of the task request commences. When a task request completes execution, it is removed from the In-Service queue, and if its next execution time does not exceed the pre-specified time interval of the solicitor function 104, is re-entered into Priority-Ordered queue 108 in sorted position. If its next execution time does exceed the pre-specified time interval, the task request is discharged from memory and its lifecycle completes.

Figure 2:
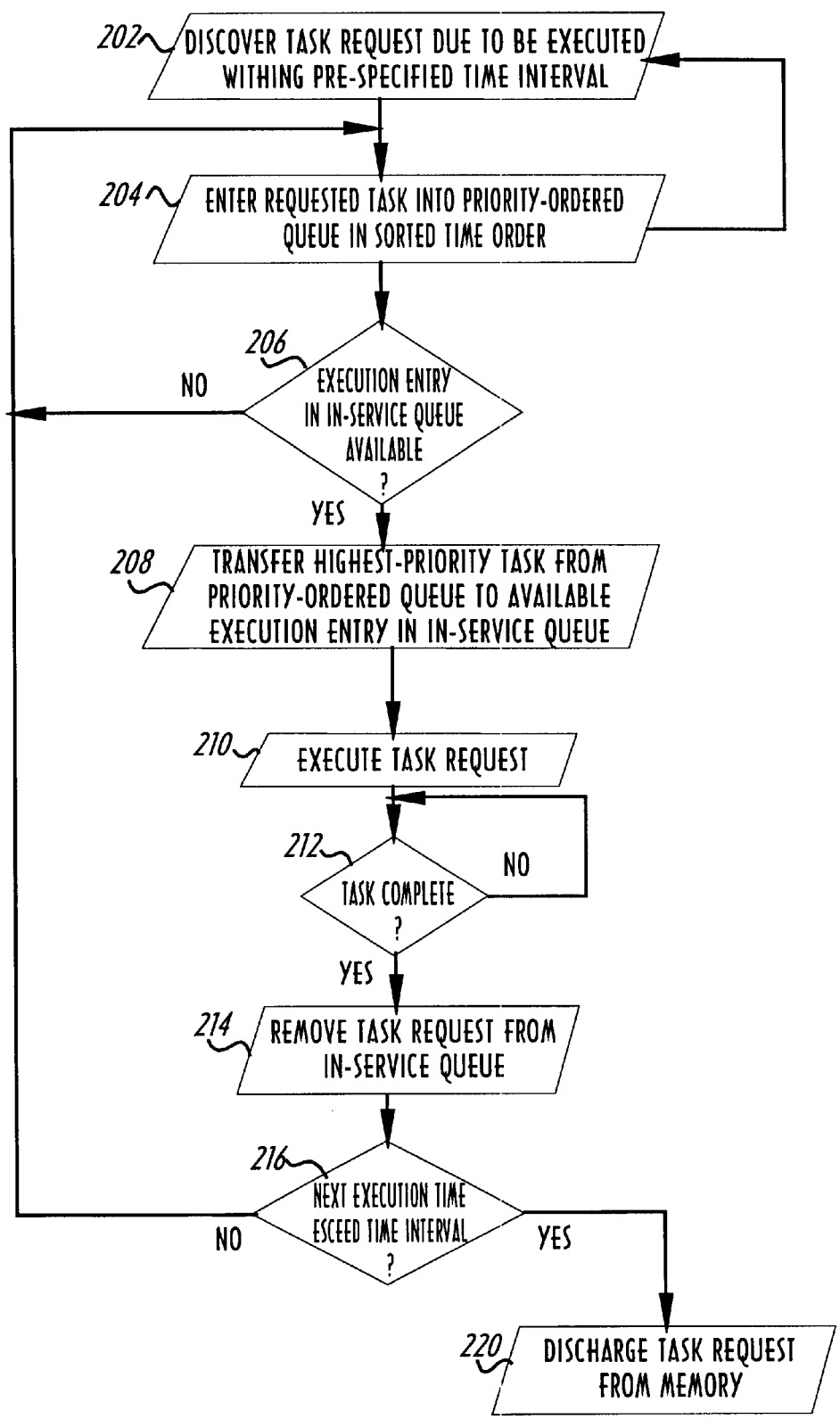
FIG. 2 is a flowchart describing the steps performed by the governed scheduling system of the invention.

FIG. 2 is a flowchart describing the steps performed by the governed scheduling system of the invention. As shown, the steps performed include a first step 202 of discovering a task request that is due to be executed within the pre-specified time interval. Task requests that are discovered to be scheduled within the pre-specified time interval are entered into a priority-ordered queue 108 in sorted time order in step 204. In-Service queue 110 is monitored in step 206 until an execution entry in In-Service queue becomes available. Once an available execution entry is discovered, the highest priority task request from priority-ordered queue is transferred to the available execution entry in In-Service queue in step 208. This is contingent on its next time due being less than or equal to the current time. In the preferred embodiment, the priority of a task request is measured in terms of time. In step 210, execution of the task request commences. Steps 202 through 210 are repeated continuously.

When a task request completes execution, as determined in step 212, it is removed from the In-Service queue in step 214. It is determined in step 216 whether its next execution time exceeds the pre-specified time interval. If its next execution time does not exceed the pre-specified time interval, the task request is re-entered into priority-ordered queue in sorted position in step 204, and the cycle is repeated. If its next execution time does exceed the pre-specified time interval, the task request is discharged from memory in step 220.

Figure 3:
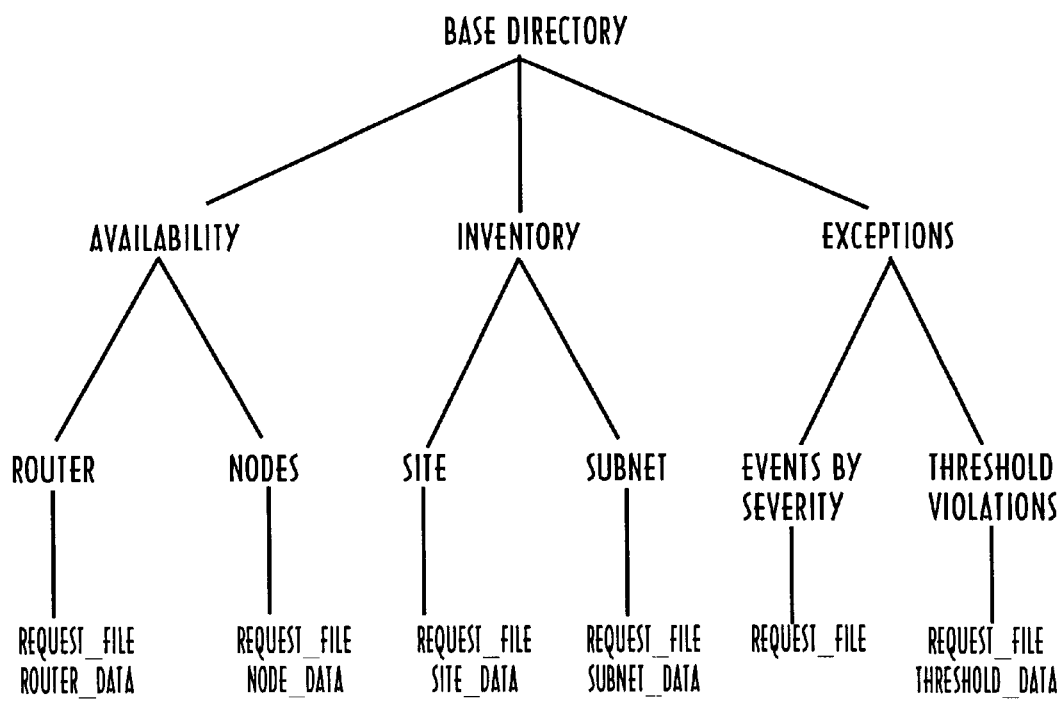
FIG. 3 is a diagram of the structure of an example file directory existing on a system.

FIG. 3 is a diagram of the structure of an example file directory tree 300 existing in file directory system 106. File directory tree 300 illustrates the hierarchical storage of individual request files in the network file system. Each leaf directory, labeled in the illustrative embodiment as "Router", "Nodes", "Site", "Subnet", "Events by Severity", and "Threshold Violations", contains a request file, each of a name recognizable by the search utility (i.e., Solicitor function 104), labeled "Request_File" in FIG. 3, that contain command lines for executing a particular task, and an accompanying schedule, discussed in FIG. 4, indicating when to execute the task on a periodic basis. Each request file is accompanied, in the same directory where the request file is found, by all files necessary to execute the request.

Figure 4:
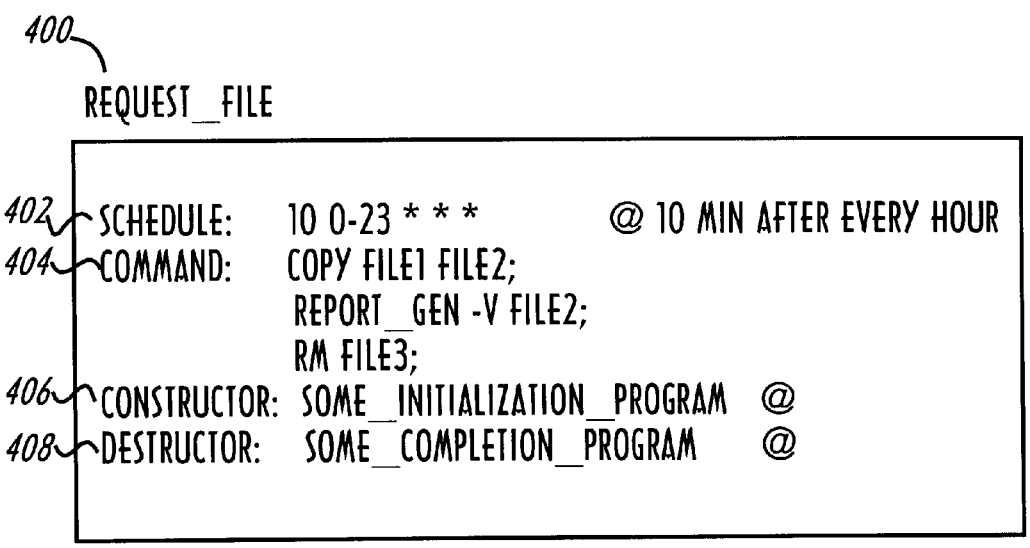
FIG. 4 illustrates an example format of a request file.

FIG. 4 illustrates an example format of a request file 400 that resides in file directory system 106. In accordance with one embodiment of the request file format, the task to be performed and schedule for performing the task are indicated according to a pre-defined format. A schedule is placed on a line, e.g., 402; a command line executable program is placed on one or more next lines 404, and if required for execution, a command constructor code is placed on a line 406 following the command lines 404, and a command destructor code is placed on a line 408 following line 406 if it exists or lines 404 otherwise. In the preferred embodiment, the request file must include a schedule line 402 and a command line 404; however, their position within the file is not fixed. A set of utilities parses request file 400 into a set of name/value/attribute tuples of information. In the illustrative embodiment, the name/value/attribute tuple of line 402 of request file 400 would yield:

| | |
|---|---|
| Name = | "schedule" |
| Value = | "10 0–23 * * *" |
| Attrubute = | "10 min after every hour" |

A set of access control utilities is also provided to create a semaphore file adjacent to the request file being parsed. Cooperating programs and threads yield to the presence of the semaphore file. Solicitor 520 and Service Manager 516, discussed with respect to FIG. 5, are examples of threads which cooperate.

Figure 5:
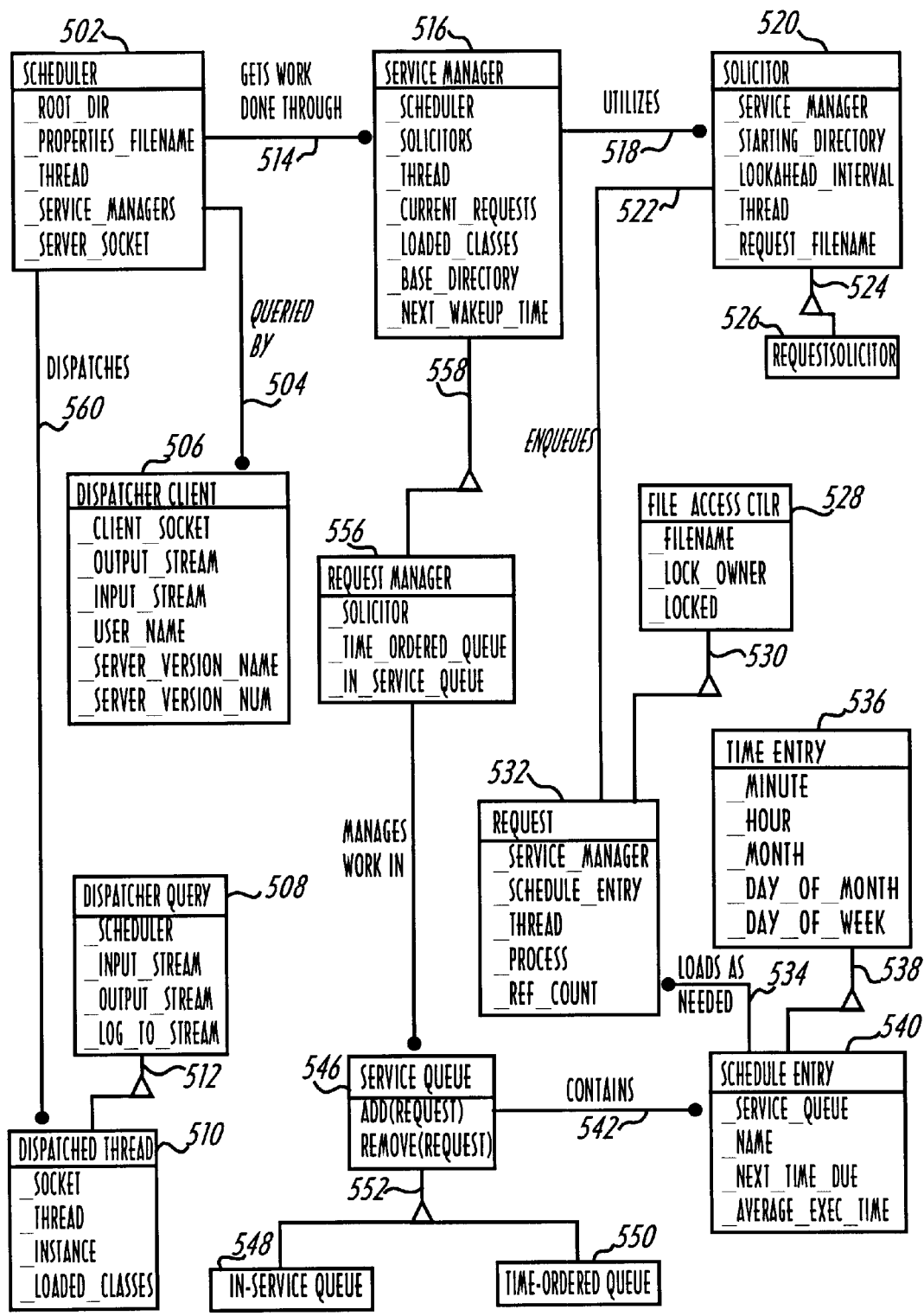
FIG. 5 is a data model of one preferred embodiment of the invention.

FIG. 5 is a data model 500 of the implementation of a preferred embodiment of the invention. Data model 500 is a set of defined classes, implemented in the Java® programming language in the preferred embodiment, that are dynamically instantiated for the lifetime of the scheduling thread.

Scheduler 502 is the starting point for DispatcherQuery 508 navigation. As DispatcherClient 506 objects make method calls on method server_socket of Scheduler 502, they are serviced by DispatchedThread 510 to perform the actual query in a thread within Scheduler 502. DispatcherClients 506 are able to obtain information as to the socket address port of their Scheduler 502, send it a class name and arguments to load a DispatcherQuery 508 on the server side, and wait for the results to come back through the standard output "stdout". DispatcherThreads 510 provides a thread of execution for each DispatcherQueries 508 to perform their work within the process space for Scheduler 502. Dispatcher Thread 510 is itself an instance of DispatcherQuery 508, but is unique in the sense that it represents the head of the query. DispatcherQuery 508 is a query to be performed on Scheduler 502 identified to it through the DispatcherThread 510.

ServiceManager 516 is an abstract base class that provides the thread but relys on its derived implementations to know what file they seek and "know how" on how to service them. Once request files are discovered that contain task requests for this object to perform, they are placed in a PriorityOrderedQueue 550 to await dispatch to InService Queue 548 for execution.

Solicitor 520 is an abstract base class that always comes paired with a derived class of ServiceManager 516. As ServiceManagers 516 are instantiated, they are given an opportunity to load their Solicitor 520. A Solicitor 520 searches the file system for a request file of a predefined name agreed upon with its ServiceManager 516. Solicitor 520 typically looks for files that need to begin their program execution within a specified look_ahead_interval.

Figure 6:
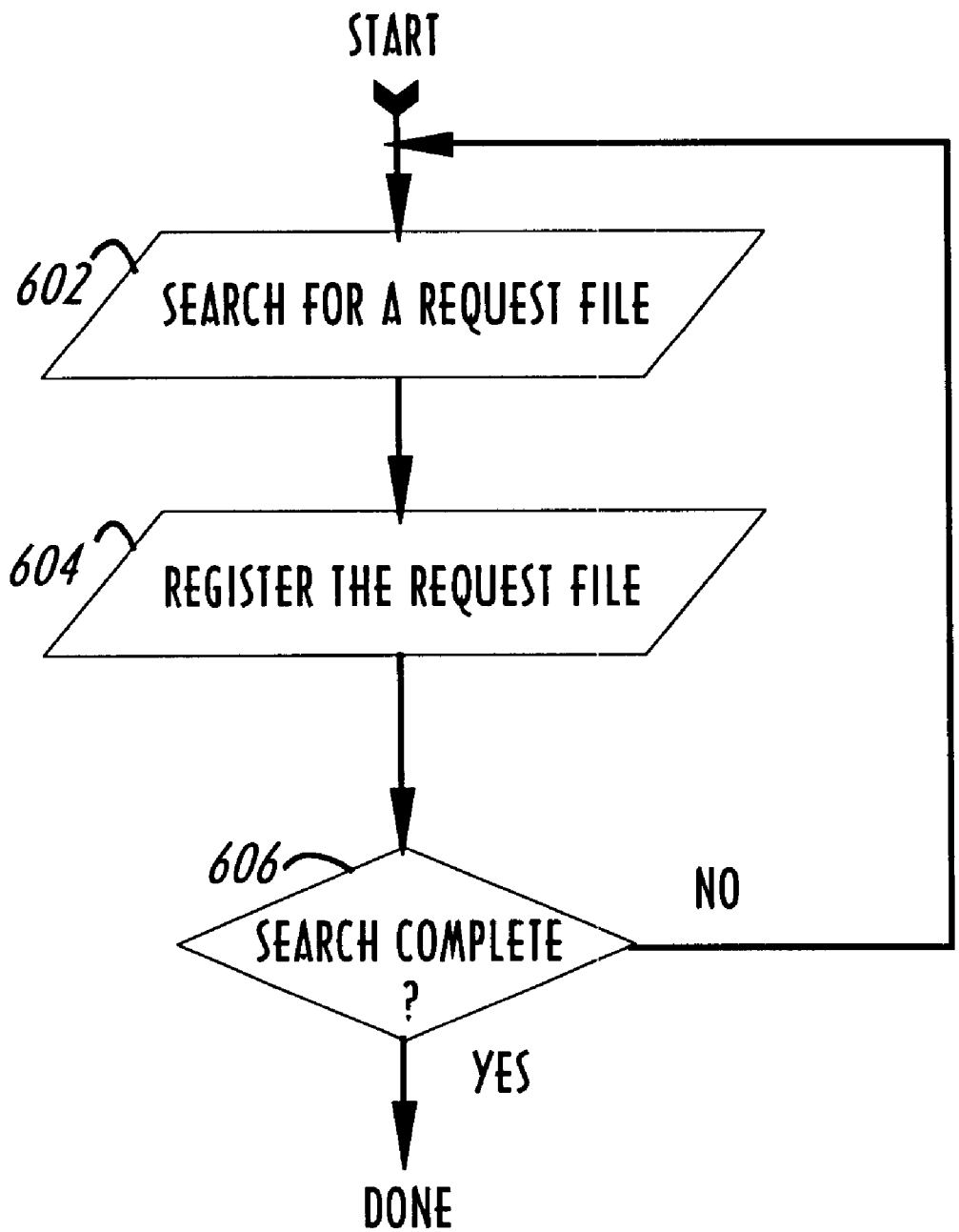
FIG. 6 is a flowchart illustrating the steps performed by a search utility that registers schedule requests with the scheduler process.

FIG. 6 is a, flowchart illustrating the steps performed by a solicitor 520 that registers schedule requests with the scheduler process. As shown, solicitor 520 traverses the file directory tree in a step 602, typically using a depth-first search, looking for request, files. When a request file is found, in step 604 solicitor 520 registers the task request specified in the contents of the request file with service manager 516. In the preferred embodiment, solicitor 520 registers the task request by determining if the task request is due to be scheduled within a specified interval of time, and, if so, placing the task request in a priority ordered queue 550. The solicitor 520 determines whether any portions of file directory tree remain to be searched in a step 606, and repeats steps 602 and 604 until the entire file directory system 106 has been searched. In one implementation, a solicitor function is employed to seek out request files, all of a specific given name (e.g., request.properties) from a base directory specified at runtime. For example, with reference to file directory tree 300, the solicitor function may be instructed to begin its search from directory "Base Directory". Solicitor function searches the tree, using a depth-first search algorithm, for files having the name "request.properties". When a file of this name is encountered, solicitor 520 parses the contents of the file to retrieve the schedule and command line for the process to be scheduled.

RequestManager 556 is a derived implementation of abstract base class ServiceManager 516. RequestManager 556 manages a set of ServiceQueue 546 known only to it and not to its base class, which assists it in keeping track of what state each job it is servicing is in. Some jobs may be executing (i.e., exist in the InServiceQueue 548) while others may be waiting in line to be performed (i.e., exist in the PriorityOrderedQueue 550).

ServiceQueue 546 is an abstract interface. ServiceQueue 546 requires that queues implemented to service RequestManager 556 know how to properly add and remove entries in the RequestManager 556. As entries are manipulated, ServiceManager 516 must be notified of the changes as it keeps a list of current_requests known in all queues. Both InServiceQueue 548 and PriorityOrderedQueue 550 are derived from this object to enforce correct management of ScheduleEntries 540.

TimeEntry 536 is an object/data structure which defines a time schedule in segmented characteristics which complement the defined format of the request file.

ScheduleEntries 540 are maintained in ServiceQueues 546. ScheduleEntries 540 represent place holders for Requests 532. A ScheduleEntry 540 can be queried at any time to determine when it is "due" to be scheduled. The one incarnation of a ScheduleEntry 540 may be used to load and execute a unique Request 532 on the file system. In other words, the name of the ScheduleEntry 540 is the location of one unique Request 532 on the file system that may be manipulated as many times as necessary. Requests 532 are lockable objects which have persistence in files of the file systems. As they are loaded through their constructors, a lock is obtained through its base class FileAccessCtlr 528. This safety measure is necessary in a multi-threaded and multi-process environment seeking to modify and have sole access rights. Requests 532 may be loaded to examine their contents or execute the command based on its prescribed schedule.

Figure 7:
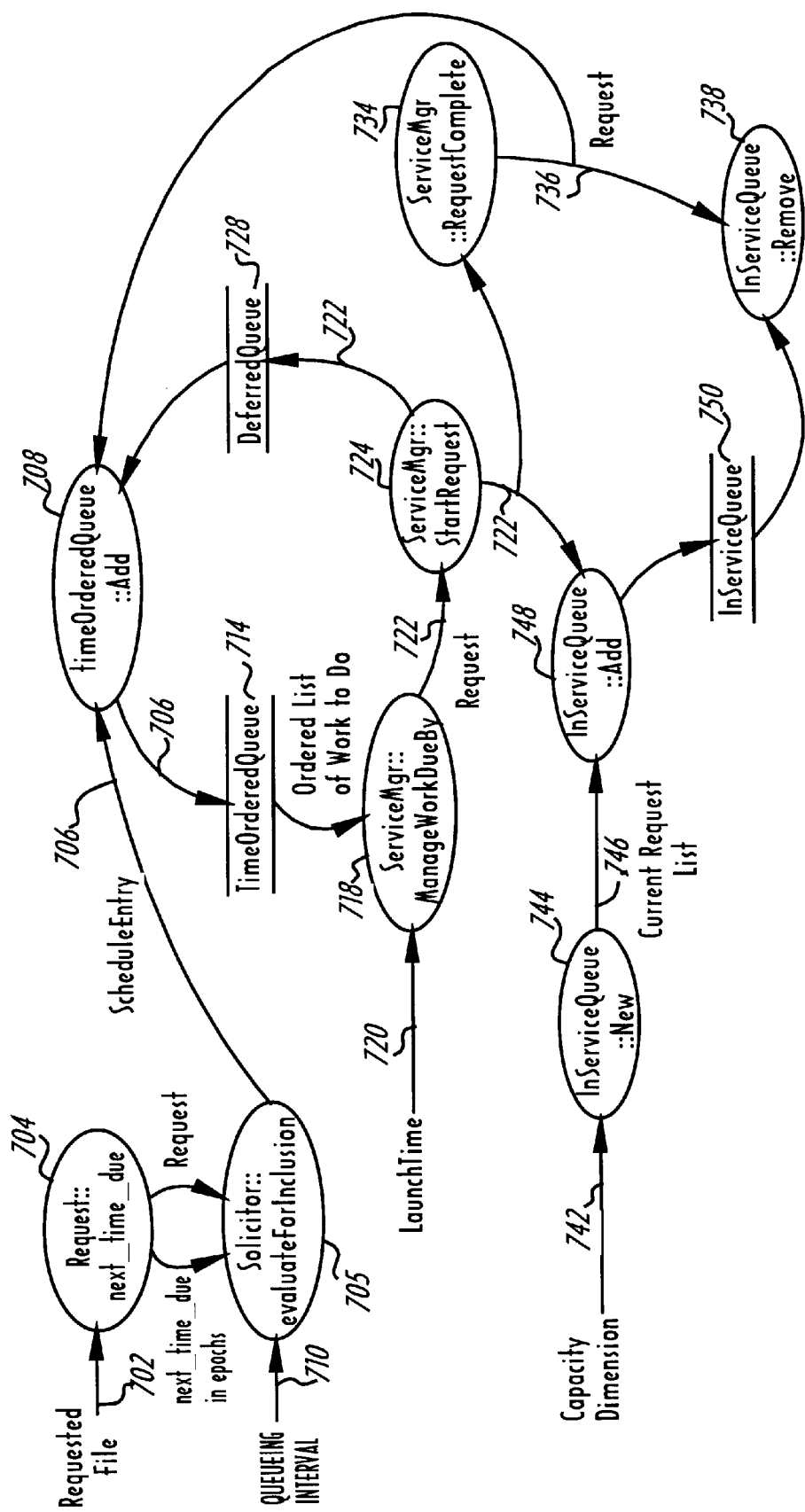
FIG. 7 is a flow diagram of the method of operation of the data model of FIG. 5.

FIG. 7 is a flow diagram of the method of operation 700 of data model 500. Solicitor 520 searches for request files. When a request file 702 is found, the request file 702 is parsed to extract the schedule and command line to be executed. The "next_time_due", which is the next time the command is scheduled to be executed, is calculated in step 704. If the request produced in step 704 meets the time criteria required for inclusion in the TimeOrderedQueue 714, as determined in step 705, its ScheduleEntry (i.e., abbreviated form of the Request) is added to TimeOrderedQueue 714 in step 708. In step 705, the next_time_due is compared to a look ahead interval to determine whether the ScheduleEntry 706 should be added to the PriorityorderedQueue 714. The look ahead interval 710 is a pre-specified time interval. Solicitor 520 is a thread that wakes up every look ahead interval, discovers request files on the portion of the system file directory that it is responsible for, and then goes to sleep again until the beginning of the next lookahead interval. Solicitor 520 repeats this cycle as long as the scheduling governor of the invention is running. If, in step 708, the next_time_due for the ScheduleEntry 706 is within the pre-specified lookahead interval, a priority in terms of time is associated with the ScheduleEntry 706 and it is added to the PriorityorderedQueue 714. In the preferred embodiment, PriorityOrderedQueue 714 is a first-in first-out (FIFO) queue sorted in order of time, and the priority associated with a given ScheduleEntry 706 is indicated simply by the position of the ScheduleEntry 706 in the PriorityOrderedQueue 714. In other words, the ScheduleEntries 540 contained in PriorityOrderedQueue 714 are positioned in the order in which they are to be launched by ServiceManager 516. If the next_time_due for the ScheduleEntry 706 is not due within the pre-specified lookahead interval, it is discarded from memory, or alternatively, is restored to its sorted position in the PriorityOrderedQueue 714.

ServiceManager 516 is a thread that wakes up and executes on a schedule, e.g., every minute on the minute. When ServiceManager 516 wakes up, it compares the current time, or launch time 720, with the next_time_due of the ScheduleEntries 540 contained in PriorityorderedQueue 714. If the launch time 720 matches the next_time_due of a ScheduleEntry 540 contained in the time-ordered queue 714, ServiceManager 516 creates an instance 722 of a Request 532 in a step 718. Service_manager method communicates in steps 724 with ServiceQueue 546 to add Request 722 to InServiceQueue 750. If InServiceQueue 750 has an available execution entry, Request 722 is added to InServiceQueue 750 in step 748. If InServiceQueue 750 is full, meaning that the maximum number of concurrent processes are currently executing, Request 722 is returned to TimeOrderedQueue 714. In the alternative, Request 722 is added to a DeferredQueue 728. Just before ServiceManager 516 thread goes to sleep, it restores any existing Requests 722 in DeferredQueue 728 to PriorityOrderedQueue 714. In this embodiment, Requests 722 that are unable to be added to InServiceQueue prior to their being due, do not get executed. Accordingly, arbitration of which Requests get executed when too many Requests are clustered around the same time due is left to the system administrator or some other method of negotiation between competing interests.

When Requests 722 are added to InServiceQueue 750, a Request thread is launched to execute the command associated with the Request 722. The Request thread monitors the process that it has launched, and once the process completes, the Request thread calls a request complete function in step 734, which captures the process' exit code, standard output file and standard error file. During step 734, the Request 722 is given an opportunity to be fed back into PriorityOrderedQueue 714 by determining in step 708 whether its next_time_due is within the current lookahead interval. If it is not, the lifecycle of the thread of Request 722 ends. In step 738 a remove function of ServiceQueue 546 removes the Request 722 from InServiceQueue 750, which makes available an execution entry in InServiceQueue 750 for another Request 722 from PriorityorderedQueue 714.

When the scheduling governor is first started up, InServiceQueue 750 is created in step 744, having a size specified by a user-defined capacity dimension 742. Capacity dimension 742 operates as the governed cap on number of concurrently executing processes allowed at any given time. Accordingly, with respect to FIG. 1, the capacity dimension 742 is set to N, and In Service Queue 110 comprises N execution entries.

It will be appreciated from the above detailed description that the scheduling governor of the invention provides an effective method for limiting the number of simultaneously scheduled task requests to a maximum number of concurrently executing task requests.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A task scheduling governor for regulating the number of scheduled tasks that are executed concurrently by a computer processing system, comprising:

an execution queue comprising at least one task request thread, said task request thread having an associated task due to be executed within a pre-specified time interval and an associated priority indicating a priority of said associated task;

an In-Service queue limited to a pre-specified number of In-Service queue entries comprising zero or more currently active task request threads each of which is commenced upon entry into said In-Service queue, said currently active task request thread commencing and monitoring execution of processes required to complete its associated task, and removing itself from said In-Service queue upon completion of its associated task;

a service manager which accepts task requests only from said execution queue into said In-Service queue, wherein said service manager monitors said In-Service queue and transfers said task request threads from said execution queue to said In-Service queue as space becomes available in said In-Service queue; and a solicitor function which actively seeks out and discovers tasks that are due to be executed within said pre-specified time interval and enters a task request thread associated with each said discovered tasks into said execution queue.

2. A method in accordance with claim 1, wherein:

said execution queue is ordered in terms of priority.

3. A method in accordance with claim 2, wherein:

said priority comprises priority in time.

4. A method in accordance with claim 1, comprising:

a deferred task queue, said deferred task queue comprising zero or more task request threads from said execution queue that are due to be executed but cannot be transferred to said In-Service queue due to unavailable In-Service queue entries.

5. A method for limiting a number of concurrently executing scheduled tasks in a computer system to a pre-specified capacity dimension, said method comprising:

actively seeking out and discovering a task that is due to be executed within a pre-specified time interval;

entering a task request thread associated with said discovered task into an execution queue;

monitoring an In-Service queue comprising a plurality of currently active task entries equal in number to said capacity dimension;

transferring a task request thread only from said execution queue to said In-Service queue if said In-Service queue has an available currently active task entry, said task request thread becoming a currently active task upon entry into said available currently active task entry; and upon entry of said transferred task request thread into said In-Service queue:

commencing execution of said task associated with said transferred task request thread;

monitoring said execution of said task associated with said transferred task request thread; and removing said transferred task request thread from said In-Service queue upon completion of said task associated with said transferred task request thread.

6. A method in accordance with claim 5, comprising:

wherein said execution queue is ordered in terms of Priority and said task request threads in said execution queue are transferred to said In-Service queue in order of priority.

7. A method in accordance with claim 5, comprising:

determining whether a next time due of said removed transferred task request thread exceeds said pre-specified interval;

if said next time due does not exceed said pre-specified time interval, re-entering said transferred task request thread into said execution queue.

* * * * *